(12) United States Patent
Chan

(10) Patent No.: US 6,810,822 B1
(45) Date of Patent: Nov. 2, 2004

(54) AGRICULTURAL AND GARDENING FERTILIZER APPLICATOR

(76) Inventor: Yao-Pang Chan, No 5 Alley 100, Lane Kuang-Yun, Kuang-Yun Village, Yung-Ching Hsiang, Changhua Hsien (TW)

( * ) Notice: Subject to any disclaimer, the term of this patent is extended or adjusted under 35 U.S.C. 154(b) by 0 days.

(21) Appl. No.: 10/681,187

(22) Filed: Oct. 9, 2003

(51) Int. Cl.$^7$ ............................. A01C 7/08; A01C 17/00
(52) U.S. Cl. ....................................... 111/130; 221/185
(58) Field of Search .................. 111/130–133; 222/185

(56) References Cited

U.S. PATENT DOCUMENTS 3,229,857 A * 1/1966 Kirschmann ................ 222/159
3,937,447 A * 2/1976 Alwes et al. ................. 366/79
6,262,553 B1 * 7/2001 Menze ........................ 318/663

* cited by examiner

Primary Examiner—Christopher J. Novosad
(74) Attorney, Agent, or Firm—Rabin & Berdo, P.C.

(57) ABSTRACT

An agricultural and gardening fertilizer applicator comprised of a container filled with a granular, the container having sloping surfaces at the bottom; a worm gear feed rod, a container output port, the worm gear feed rod subjected to the rotational force of a drive mechanism, the pliant delivery hose conjoined to a long pipe; and a manual switch for starting and stopping the drive mechanism. The drive mechanism is connected to a controller, it consisting of power off, intermittent on, and a continuous on. When the long pipe sharp scoop tip is moved to the root section, pressing the switch causes the drive mechanism to start the rotation of the worm gear feed rod, forcing the fertilizer downward under pressure through the output opening to the worm gear feed rod and into the pliant delivery hose, the long pipe, the sharp scoop tip, and onto the root section.

3 Claims, 3 Drawing Sheets

AGRICULTURAL AND GARDENING FERTILIZER APPLICATOR

BACKGROUND OF THE INVENTION

1) Field of the Invention

The invention herein relates to horticultural equipment, specifically an agricultural and gardening fertilizer applicator that enables the operator to set the drive mechanism controller in a the fertilizer applicator according to actual site requirements to achieve fluctuating or constant fertilizer application in a manner which is convenient to operate, easy to utilize, and does not involve the fingers.

2) Description of the Prior Art

Conventional flower, bonsai, herb, fruit and other plant fertilizing methods involve human labor, wherein fertilizer is placed in a bucket to facilitate carrying, following which the worker uses one hand to tote the fertilizer and the other hand to grab and scatter it. Farmers firmly believe that the quantity utilized is determined by the requirements of the crops. The farmers locate the appropriate position to deposit the crop fertilizer and then grasp and apply the fertilizer by the handful. In such an approach, the person doing the fertilizing must bear the weight of the bucket with one hand and bend at the waist to apply the fertilizer, which results in a considerable load on the body and is quite inefficient. With the amount of fertilizer applied determined by the different crop fertilizing experience of every farmer, fertilizing is inconsistent because it occurs by feeling. As a result, average amounts and accuracy are not possible, with the errors in the fertilizer location and quantity often leading to crop damage.

SUMMARY OF THE INVENTION

In view of the said situation, the applicant of the invention herein addressed the shortcoming and sought improvements, culminating in the successful development of the invention herein which is submitted in application for patent rights. The primary objective of the invention herein is to provide an agricultural and gardening fertilizer applicator comprised of a container filled with a granular or a powderized fertilizer, the container having sloping surfaces at the bottom that converge into an output opening below; a worm gear feed rod (auger) that provides for pushing the fertilizer into a long pipe, a container output port, and then through a pliant delivery hose, the said worm gear feed rod subjected to the rotational force of a drive mechanism to which it is coupled, the pliant delivery hose conjoined to a long pipe, with a sharp scoop tip disposed at the output portion of the long pipe; and a manual switch for starting and stopping the drive mechanism; the drive mechanism is connected to a controller, the controller of including three switchable operating modes: power off, intermittent on, and a continuous on, enabling the operator flexibility based on actual site requirements such that when the controller is set to the intermittent on and continuous on position, complete control is achieved over the quantity and application of the dispensed fertilizer and, furthermore, healthily and safely protecting the hands because there is no contact with fertilizer, while saving physical energy, with fluctuating or constant fertilizer application performed in a manner that is convenient to operate and easy to utilize.

DETAILED DESCRIPTION OF THE INVENTION

Figure 1:
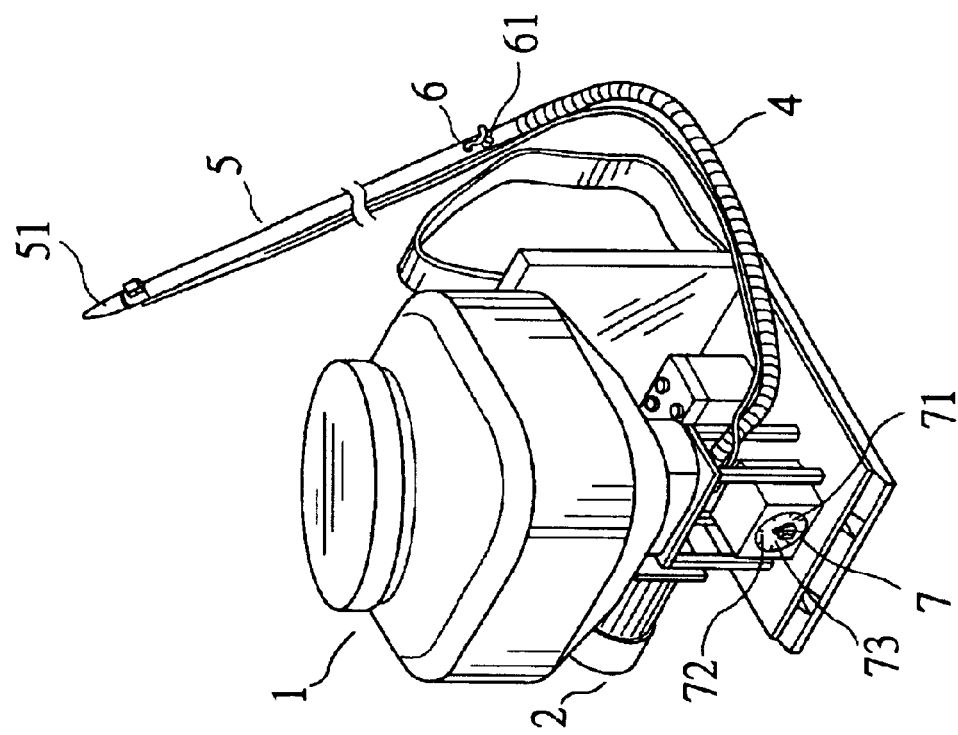
FIG. 1 is an exploded drawing of the invention herein.
Figure 2:
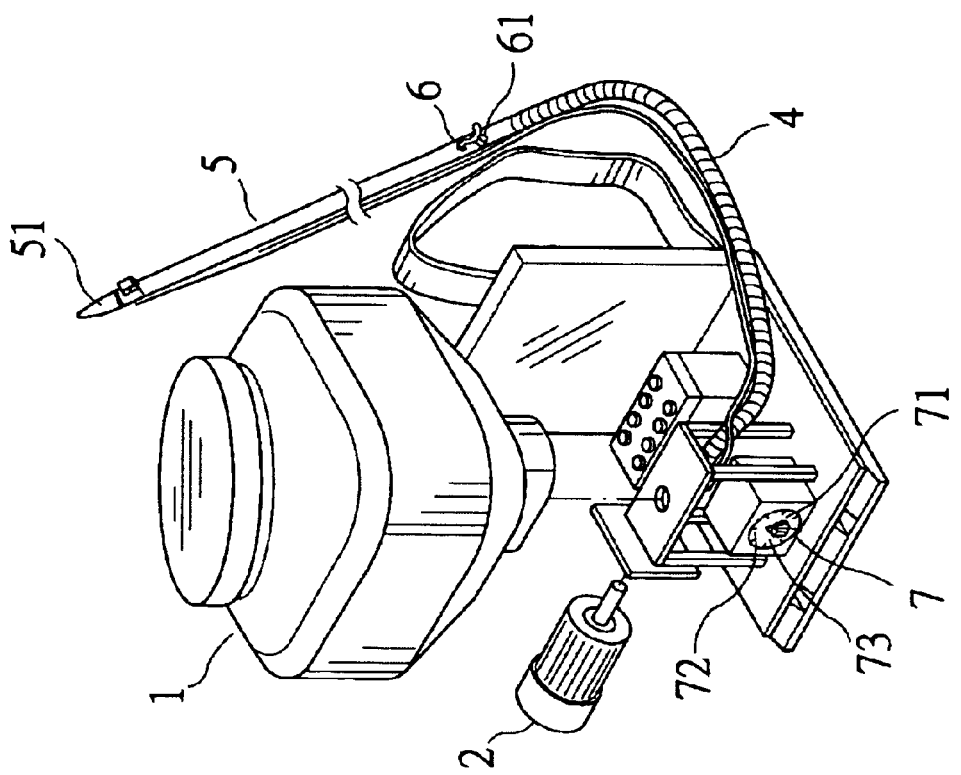
FIG. 2 is an isometric drawing of the invention herein.
Figure 3:
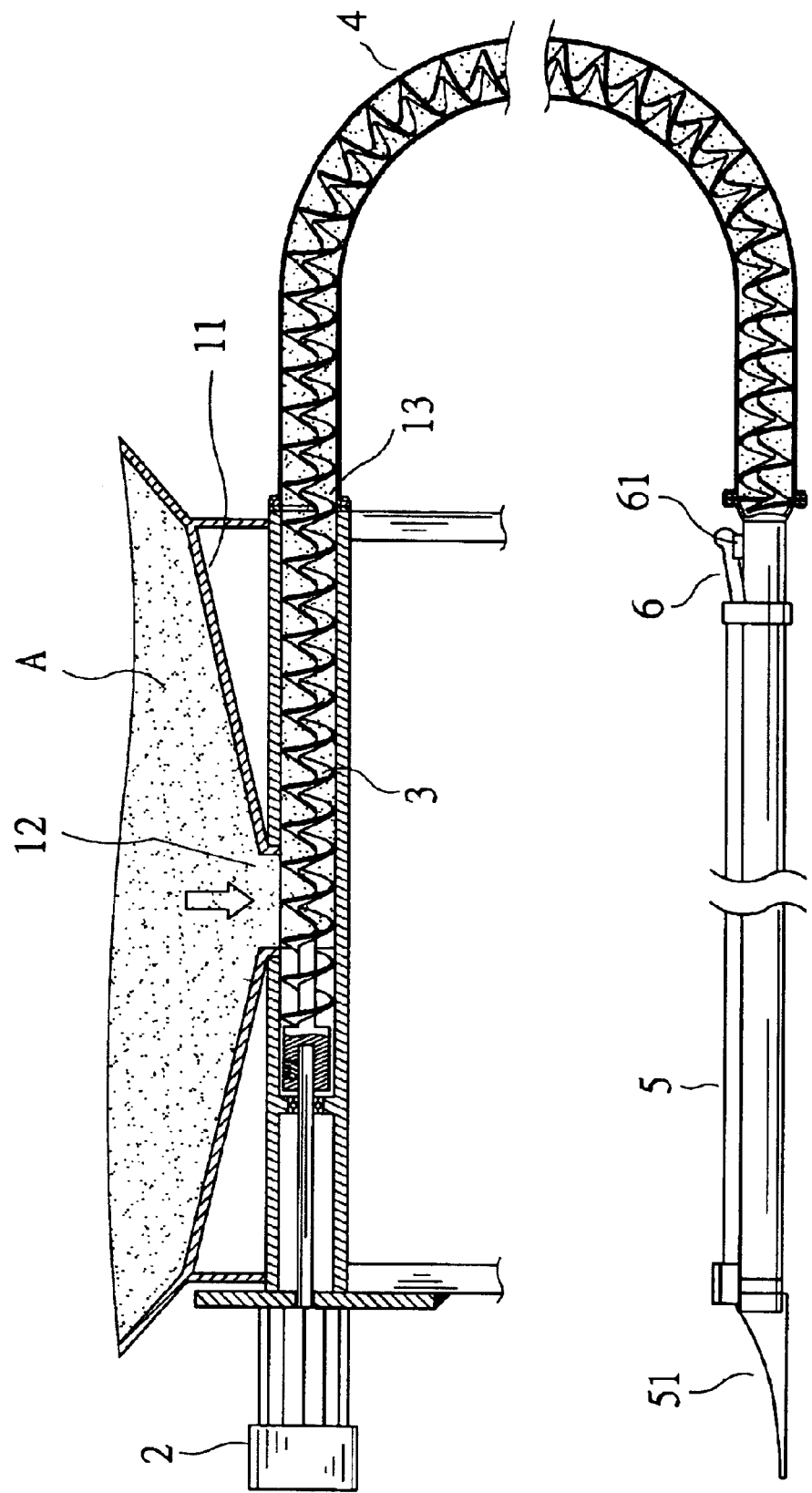
FIG. 3 is a cross-sectional drawing of the interior section of the invention herein.

Referring to FIG. 1 and FIG. 2, the agricultural and gardening fertilizer applicator of the invention herein is comprised of a container I filled with a granular or a powderized fertilizer A, the container 1 fabricated such that it has sloping surfaces 11 at the bottom, the sloping surfaces 11 converging into an output opening 12; a drive mechanism 2 situated at the lower extent of the output opening 12, the power of which is transferred via coupling to a flexible auger feed rod 3 (as shown in FIG. 3), with the auger feed rod 3 routed through a container output port 13 that is attached to a pliant delivery hose 4, the pliant delivery hose 4 conjoined to a long pipe 5, with a sharp scoop tip 51 disposed at the output portion of the long pipe 5; and a manual switch 6 and an induction button 61 for operating the drive mechanism 2, wherein the drive mechanism 2 is connected to a controller 7, the controller 7 including three switchable operating modes: power off 71, intermittent on 72, and a continuous on 73.

Figure 4:
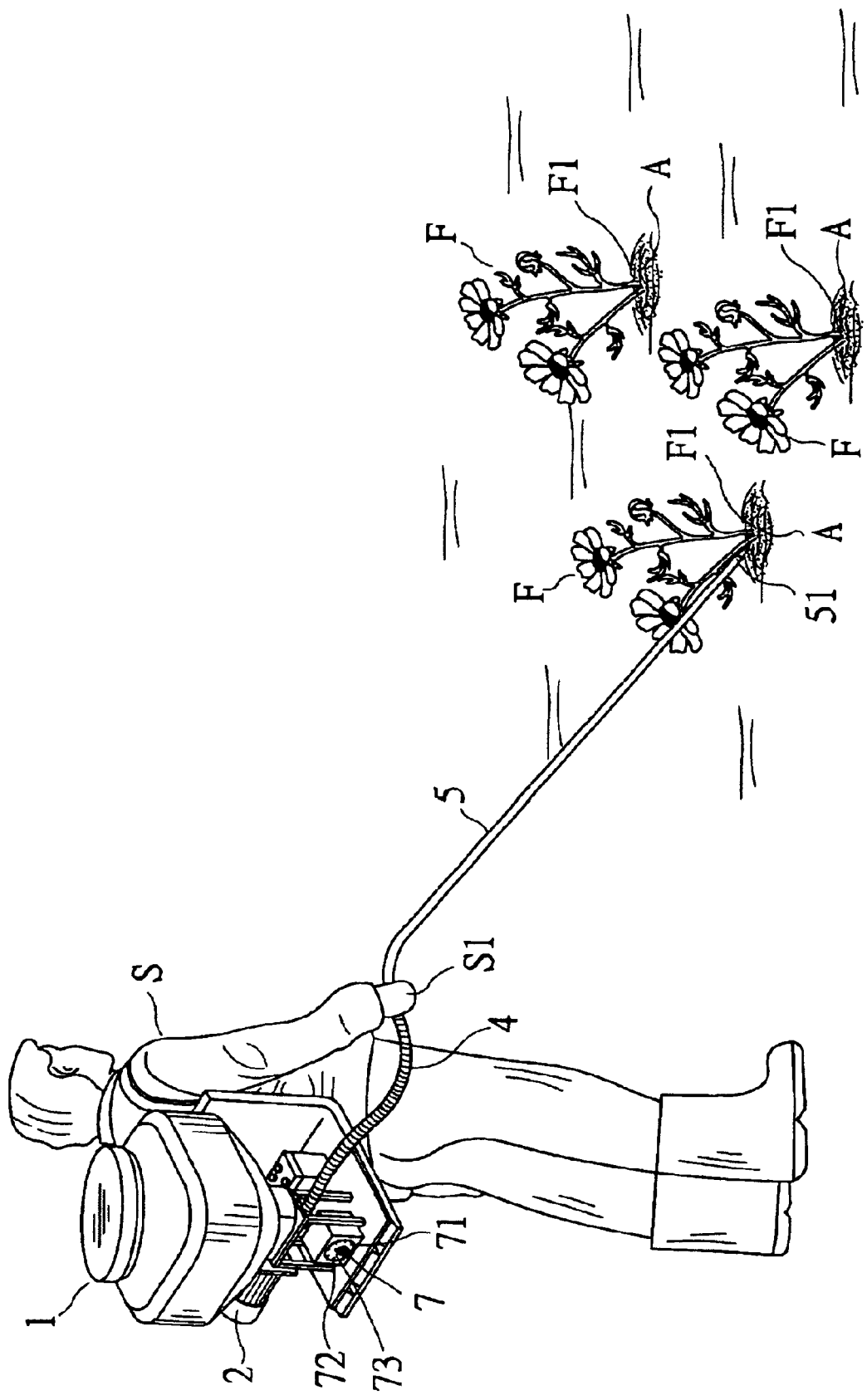
FIG. 4 is an illustration of an embodiment of the invention herein.

As such, after the operator S wears the container 1 and its structural fittings, the hand S1 grasps the manual switch 6 between the delivery hose 4 and the long pipe 5, enabling the operator S according to actual site requirements, to toggle the controller 7 from the original power off 71 position to the intermittent on 72 position such that when the manual switch 6 and the induction button 7 are constantly pressed, the controller 7 triggers an automatic timer (presettable) that starts the rotation of the auger feed rod 3, forcing the fertilizer A downward under pressure through the output opening 12, the pliant delivery hose 4, and the long pipe 5, and as the long pipe 5 sharp scoop tip 51 is moved to the root section F1 of the flower plant F (or fruit or other agricultural plant), the manual switch 6 on the long pipe 5 is pressed once again to discharge fertilizer A already in the hose to the flower F root section F1, as indicated in FIG. 4; at the same time, the induction button 61 of the pressed manual switch 6 that started the automatic timer and the rotation of the auger feed rod 3 maintains the conveyance of fertilizer A; when the manual switch 6 on the long pipe 5 is released, the induction button 61 terminates the rotation of the said worm gear feed rod 3 and following the movement of operator S, the manual switch 6 on the long pipe 5 is pressed once again, the fertilizer A in the hose is dispensed on the flower plant F root section F1, while the induction button 61 causes the controller 7 to start the automatic time and the rotation of the worm gear feed rod 3 to continue fertilizer A application.

When the controller 7 is in the continuous on 73 position, and the manual switch 6 on the long pipe 5 is constantly pressed to deliver fertilizer a, the drive mechanism 2 operates and loads without interruption; as such, the present invention enables complete control over fertilizer quantity and adjustment and, furthermore, in addition to healthily and safely protecting the hands because there is no contact with fertilizer, the invention herein saves physical energy by precluding scattering by hand, is convenient to operate, easy to use, healthy and safe, and multiple mode switchable.

In summation of the foregoing section, since the invention herein is capable of convenient operation, easy utilization, healthy and safe performance, and multiple mode switchability and, therefore, meets the patent application requirements stipulated article 97 of the new patent law, the present invention is submitted to the patent bureau for review and the granting of the commensurate patent rights.

What is claimed is:

1. An agricultural and gardening fertilizer applicator, comprising:

a container that is adapted to be filled with a granular or a powder fertilizer, the container having sloping surfaces at a bottom thereof, that converge into an output opening, and having an output port that is in communication with the output opening;

a drive mechanism that is adapted to exert a rotational force;

a pliant delivery hose having a first end coupled to the output port;

a pipe having a input end coupled to a second end of said pliant delivery hose;

a scoop tip disposed at an output end of said pipe;

a flexible auger disposed within said pliant deliver hose, and extending from a position under the output opening of said container so as to be disposed to receive the fertilizer from the container via the output opening, to the second end of said pliant delivery hose, and being coupled to said drive mechanism so as to be rotatable when said drive mechanism exerts the rotational force, wherein when said flexible auger is rotated, the auger pushes the received fertilizer through the output port, through the pliant delivery hose, through the pipe, and through the scoop tip, respectively; and a manual switch for starting and stopping said drive mechanism; wherein when said switch is pressed, said drive mechanism is activated to rotate said flexible auger, conveying the fertilizer from said container, and forcing the conveyed fertilizer from the scoop tip.

2. The fertilizer applicator recited in claim 1, further comprising a controller connected to said drive mechanism, said controller being configured to have three switchable operating modes: power off, intermittent on, and continuous on, wherein when said operating mode is set to intermittent on, the fertilizer is forced from the scoop tip in a fluctuating manner, and wherein when said operating mode is set to continuous on, the fertilizer is continuously forced from the scoop tip.

3. The fertilizer applicator recited in claim 1, wherein said plaint delivery hose and said flexible auger allow said scoop tip to be repositioned relative to said container.

* * * * *